Dec. 11, 1923.
C. F. LADWIG
1,477,180
SEED CORN TIPPER
Filed Nov. 16, 1920
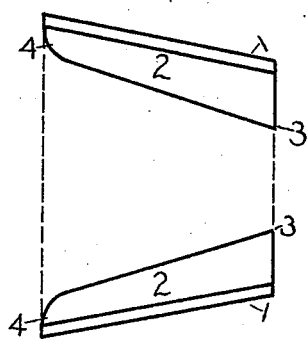
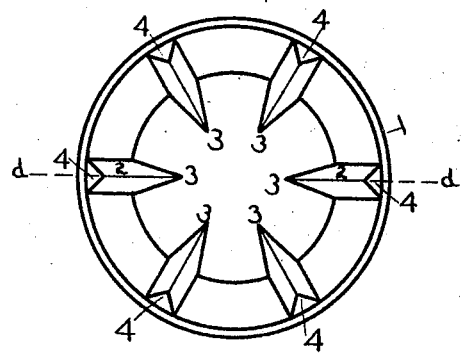
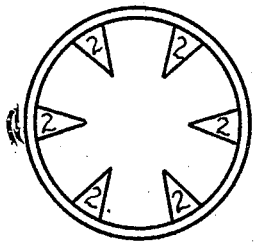
Inventor
Charles F. Ladwig.

Patented Dec. 11, 1923.

1,477,180

UNITED STATES PATENT OFFICE.

CHARLES F. LADWIG, OF HUNTSVILLE, MISSOURI.

SEED-CORN TIPPER.

Application filed November 16, 1920. Serial No. 424,521.

*To all whom it may concern:*

Be it known that I, CHARLES F. LADWIG, a citizen of the United States, residing at Huntsville, in the county of Randolph, State of Missouri, have invented a new and useful Seed-Corn Tipper, of which the following is a specification.

My invention relates to a seed corn grader, in which the object is to remove the tip and butt kernels from the cob, before shelling, thereby eliminating the more laborious way of grading seed corn after it is shelled from the cob.

It is a further object of the invention, to provide a device for the above purpose, which is in the form of a single metal casting, embodying a construction, that permits manufacturing with the very least labor.

I attain this object by the device, illustrated in the accompanying drawing, in which Fig. 1 is a sectional view of the device, on the line, $d, d$, Fig. 2. Fig. 2 is a view showing the ribs, from the larger end of the device. Fig. 3 is a view, showing the smaller end of the device.

Similar numbers refer to similar parts, throughout the several views.

1 designates the body of the seed corn grader, which is of hollow tapering, cylindrical form, the wall thereof being of requisite thickness. Upon the inner face of the body wall, spaced ribs 2 are integrally formed, said ribs being of V-shaped form, in a cross section, and converging toward the smaller end of said body 1. All of said ribs 2, extend to and terminate at the smaller end of said body 1, and have their greatest widths, located at the smaller end of said body 1, thus being of sufficient width and of sufficient space between them at the widest point of said ribs 2, so as to permit the shelled corn to pass between them, at the said widest point and out, at the smaller end of said body 1, without clogging when the tip end of a cob is between the points 3 of said ribs 2 or projecting beyond said points 3. 4 indicates the points, where ribs 2 are spaced farthest from each other, and of such a distance from each other, so as to admit the butt end of the largest ear of corn between them at said points. The ribs 2 are of less width, at the larger end of body 1, than at the smaller end of said body, so as to permit the diameter of the body 1 at its larger end, to be as small as possible, thus being better adapted to be grasped in the hand while operating the device, also requiring less metal. The outer ends of ribs 2 at the smaller end of body 1, are on a straight line with the smaller end of said body 1, thus being most suitable in the process of moulding for casting. The device being tapered is adapted to remove the butt and tip kernels from various sizes of ear corn. The ribs 2 at their widest point, approach each other at points 3, so that if a circle is drawn, touching all of said points 3, the diameter of said circle would be approximate the width of the ribs 2, at their said widest points, thus permitting only the tip end of a cob to pass slightly between them.

In operation, my device is grasped in one hand and an ear of corn is taken in the other. The tip or butt end of the ear of corn is then inserted into the larger end of my device; then giving the ear of corn a twist, which will cause the grains of corn to be shelled from the cob, by coming in contact with the ribs. The desired amount of kernels to be removed, is regulated by the depth of insertion in to the device.

Having thus described my invention, I claim as new and desire to secure by Letters Patent:

A device of the class described, consisting of a hollow, tapering metal body, having spaced ribs, of uniform size, on its inner face, converging toward the smaller end, of said body, said ribs, being of a height, at the smaller end of said body, approximately equal to the distance between the opposed ribs, located opposite each other.

CHARLES F. LADWIG.

Witnesses:
W. A. HEATHMAN,
M. J. LADWIG.